United States Patent
Nordine et al.

(10) Patent No.: US 10,546,506 B2
(45) Date of Patent: Jan. 28, 2020

(54) METHOD AND SYSTEM FOR TRACKING DISTANCE TRAVELLED BY AIRCRAFT

(71) Applicant: SKYTRAC SYSTEMS LTD., Kelowna (CA)

(72) Inventors: Malachi Nordine, Kelowna (CA); Michael Douglas Ball, Kelowna (CA); Gordon Maxwell Ross, Kelowna (CA); Craig Darin Cote, Kelowna (CA); Michael Regehr, Kelowna (CA); Jessica Mcara, Kelowna (CA); Scott Lahay, Kelowna (CA)

( * ) Notice: Subject to any disclaimer, the term of this patent is extended or adjusted under 35 U.S.C. 154(b) by 725 days.

(21) Appl. No.: 15/110,332

(22) PCT Filed: Jan. 19, 2015

(86) PCT No.: PCT/CA2015/000031
§ 371 (c)(1),
(2) Date: Jul. 7, 2016

(87) PCT Pub. No.: WO2015/106346
PCT Pub. Date: Jul. 23, 2015

(65) Prior Publication Data
US 2016/0335900 A1 Nov. 17, 2016

Related U.S. Application Data

(60) Provisional application No. 61/929,229, filed on Jan. 20, 2014.

(51) Int. Cl.
*G08G 5/00* (2006.01)
*H04Q 9/00* (2006.01)
*G01S 19/02* (2010.01)

(52) U.S. Cl.
CPC ............ *G08G 5/0082* (2013.01); *G01S 19/02* (2013.01); *G08G 5/0013* (2013.01); *H04Q 9/00* (2013.01); *H04Q 2209/40* (2013.01)

(58) Field of Classification Search
CPC ..... G08G 5/0082; G08G 5/0013; G01S 13/91
(Continued)

(56) References Cited

U.S. PATENT DOCUMENTS

| | | |
|---|---|---|
| 5,596,332 A | 1/1997 | Coles et al. |
| 6,995,689 B2 | 2/2006 | Crank |

(Continued)

FOREIGN PATENT DOCUMENTS

| | | |
|---|---|---|
| EP | 0 760 955 A1 | 6/1998 |
| WO | 95/28650 A1 | 10/1995 |

OTHER PUBLICATIONS

Borja Martos, Paul Kiszely, and John Foster, "Flight Test Results of a GPS-Based Pitot-Static Calibration Method Using Output-Error Optimization for a Light Twin-Engine Airplane", AIAA Atmospheric Flight Mechanics Conference, Aug. 2011, p. 7, paragraph 3, in section C, and on p. 14, paragraph 6, in section F.*

(Continued)

*Primary Examiner* — Harry K Liu
(74) *Attorney, Agent, or Firm* — Bennett Jones LLP

(57) ABSTRACT

A method and system is provided for encoding and compressing real-time GPS location data collected by a transceiver unit mounted in an aircraft, for transmitting the data and for receiving the data at a ground station configured for decoding the data. Data can be sampled at one-second intervals, then encoded and transmitted in data packets at longer timed intervals. The encoding method can utilize information about the operating characteristics of the aircraft to reduce the number of bits required for the data packets. Multiple encoding schemes can be used to compare in real-time to select the most efficient method of encoding on a packet-by-packet basis.

12 Claims, 8 Drawing Sheets

(58) Field of Classification Search
USPC .................................................. 342/357.395
See application file for complete search history.

(56) References Cited

U.S. PATENT DOCUMENTS

| | | | |
|---|---|---|---|
| 7,158,053 B2 | 1/2007 | Crank | |
| 7,436,322 B2 | 10/2008 | Crank | |
| 10,451,743 B2* | 10/2019 | Adler | B64D 45/0015 |
| 2003/0130771 A1* | 7/2003 | Crank | B64D 45/0015 |
| | | | 701/4 |
| 2003/0193409 A1 | 10/2003 | Crank | |
| 2007/0150126 A1 | 6/2007 | Crank | |
| 2008/0266054 A1 | 10/2008 | Crank | |
| 2009/0061897 A1* | 3/2009 | Hamilton | G06Q 10/08 |
| | | | 455/456.2 |
| 2016/0035225 A1* | 2/2016 | Berckefeldt | G08G 5/0078 |
| | | | 342/32 |
| 2016/0044389 A1* | 2/2016 | Spielberg | H04Q 9/00 |
| | | | 340/870.09 |

OTHER PUBLICATIONS

A. A. A. Salih, N. L. A. C. A. Zaini, A. Zhahir, "The suitability of GPS receivers update rates for navigation applications", Proceedings of World Academy of Science Engineering and Technology, International Journal of Aerospace and Mechanical Engineering, vol. 7, No. 6, 2013, p. 1012, Abstract.*

International Search Report issued in International Application No. PCT/CA2015/000031 dated May 4, 2015.

* cited by examiner

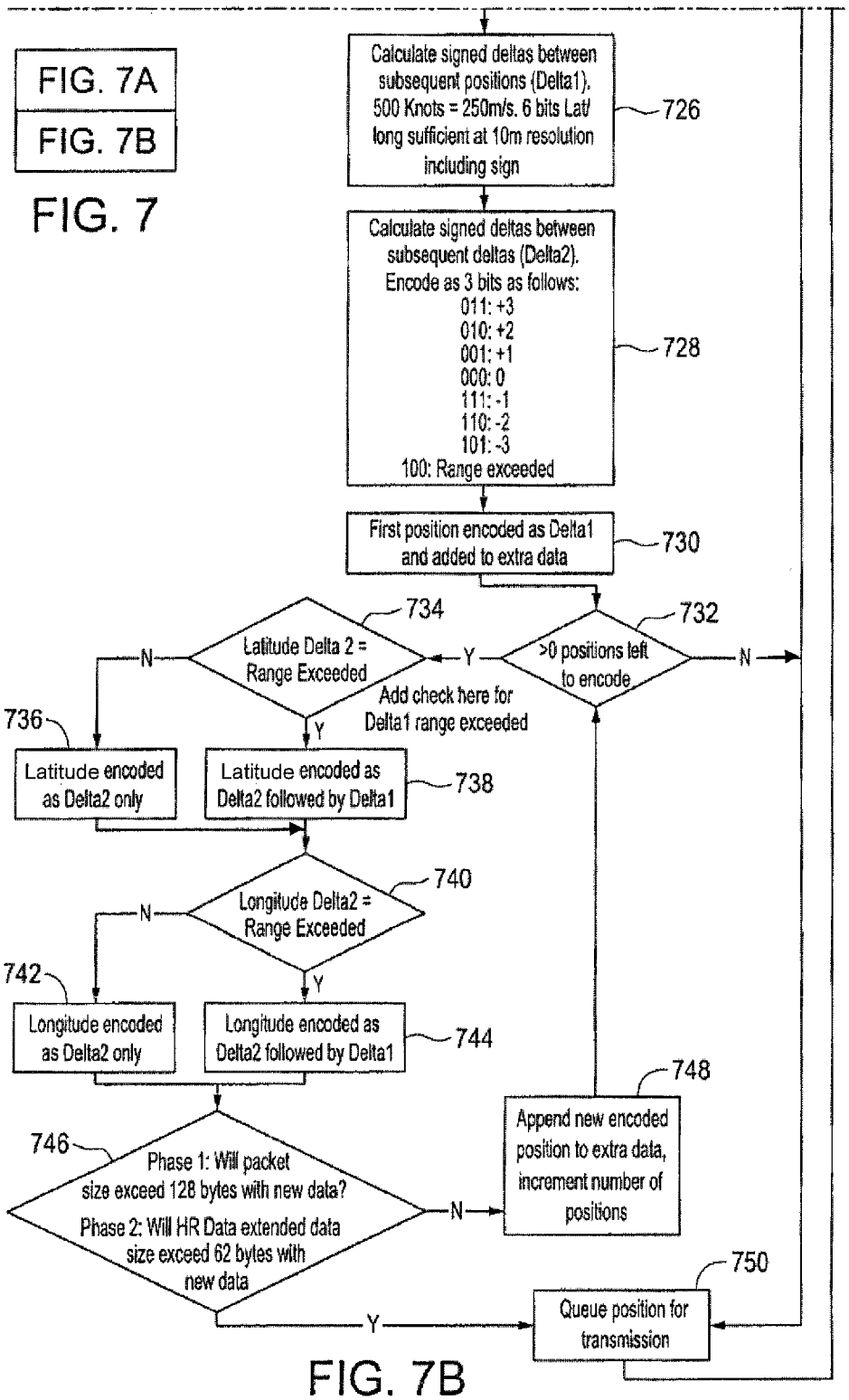

| Full Resolution Position | P(N) | P(N-1) | P(N-2) | P(N-3) | P(N-4) | P(N-5) |
|---|---|---|---|---|---|---|
| First Difference | | D1(N-1) = P(N-1)-P(N) | D1(N-2) = P(N-2)-P(N-1) | D1(N-3) = P(N-3)-P(N-2) | D1(N-4) = P(N-4)-P(N-3) | D1(N-5) = P(N-5)-P(N-4) |
| Second Difference | | | D2(N-2) = D1(N-2)-D1(N-1) | D2(N-3) = D1(N-3)-D1(N-2) | D2(N-4) = D1(N-4)-D1(N-3) | D2(N-5) = D1(N-5)-D1(N-4) |

FIG. 8

| Full Resolution Position | 10000 | 9990 | 9979 | 9966 | 9987 | 10009 |
|---|---|---|---|---|---|---|
| First Difference | | -10 | -11 | -13 | +21 | +22 |
| Second Difference | | | -1 | -2 | +34 | +1 |
| Binary Encoding | 10010000010000 | 110110 | 111 | 110 | 100010101 | 001 |

FIG. 9

METHOD AND SYSTEM FOR TRACKING DISTANCE TRAVELLED BY AIRCRAFT

CROSS-REFERENCE TO RELATED APPLICATIONS

This application is a National Phase Entry of International Application No. PCT/CA2015/000031, filed on Jan. 19, 2015, and claims the benefit of and priority to U.S. provisional patent application Ser. No. 61/929,229 filed Jan. 20, 2014 which are incorporated by reference into this application in their entirety.

TECHNICAL FIELD

The present disclosure is related to the field of tracking the distance traveled by aircraft in flight, in particular, collecting multiple sequential global positioning system ("GPS") position data and transmitting the data in a single data packet periodically.

BACKGROUND

Automated Flight Following ("AFF") systems comprising a GPS receiver and a satellite modem are common. In such systems, a position report of the aircraft is generated periodically and transmitted to a ground station comprising a computer and software for flight tracking and post-flight analysis. However, the high cost of satellite bandwidth often limits the frequency with which position reports are generated and transmitted. For applications where aircraft operators bill their customers based on received GPS position reports, the limited transmission frequency can lead to a reduced billable distance traveled.

To explain further, in air transport markets where billing is calculated based on a "loaded mile", or cumulative distance traveled, GPS position reports generated by an AFF system are often used to determine the billable distance for a flight. Since the position reports are transmitted over a satellite link, the frequency of the GPS reports is often limited to reduce communications costs, typically between 1 and 15 minutes between transmitted reports. Depending on the flight path of the aircraft, this can lead missed revenue opportunities due to the error in estimating actual distance traveled due infrequent position reporting. As shown in FIG. 1, position data taken at locations B1, B2 and B3 are used to estimate the distance traveled as being the path formed from C1 and C2, which does not reflect the actual distance traveled along actual flight path A.

It is, therefore, desirable to provide a device/apparatus/system/method/process that overcomes the shortcomings of the prior art.

SUMMARY

A method and system is provided for encoding and compressing real-time GPS location data collected by a transceiver unit mounted in an aircraft, for transmitting the data and for receiving the data at a ground station configured for decoding the data. Data can be sampled at one-second intervals, then encoded and transmitted in data packets at longer timed intervals. The encoding method can utilize information about the operating characteristics of the aircraft to reduce the number of bits required for the data packets. Multiple encoding schemes can be used to compare in real-time to select the most efficient method of encoding on a packet-by-packet basis.

Broadly stated, in some embodiments, a method can be provided for tracking distance traveled by an aircraft in flight, the method comprising the steps of: collecting position data of the aircraft during the flight; building a packet of the collected position data; encoding the packet for wireless transmission; transmitting the encoded packet to a ground station; and receiving and decoding the encoded packet, and extracting the collected position data therefrom to prepare a report summarizing the distance traveled by the aircraft.

Broadly stated, in some embodiments, the method can further comprise the step of collecting a plurality of the position data for each of a plurality of consecutive predetermined periods of time during the flight.

Broadly stated, in some embodiments, each predetermined period of time can comprise one minute.

Broadly stated, in some embodiments, the method can comprise the step of collecting position data further comprises the step of collecting global positioning system ("GPS") position data of the aircraft.

Broadly stated, in some embodiments, the method can comprise the step of collecting one GPS position per second.

Broadly stated, in some embodiments, the method can comprise the step of using a position reporting algorithm for collecting the position data.

Broadly stated, in some embodiments, the method can comprise the step of buffering the packet prior to encoding the packet.

Broadly stated, in some embodiments, the method can comprise the step of using an encoding algorithm for encoding the packet for wireless transmission.

Broadly stated, in some embodiments, a system can be provided for tracking distance traveled by an aircraft in flight, the system comprising: means for collecting position data of the aircraft during the flight; means for building a packet of the collected position data; means for encoding the packet for wireless transmission; means for transmitting the encoded packet to a ground station; and means for receiving and decoding the encoded packet, and extracting the collected position data therefrom to prepare a report summarizing the distance traveled by the aircraft.

BRIEF DESCRIPTION OF THE DRAWINGS

FIG. 8 is a table depicting encoding calculations.

FIG. 9 is a table depicting an encoding example using the table of FIG. 8.

DETAILED DESCRIPTION OF EMBODIMENTS

Figure 1:
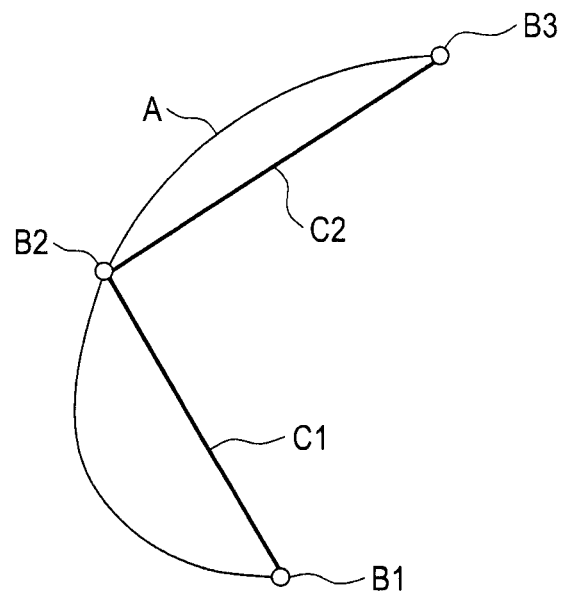
FIG. 1 is a top plan view depicting a prior art calculation of flight path using GPS reports.
Figure 2:
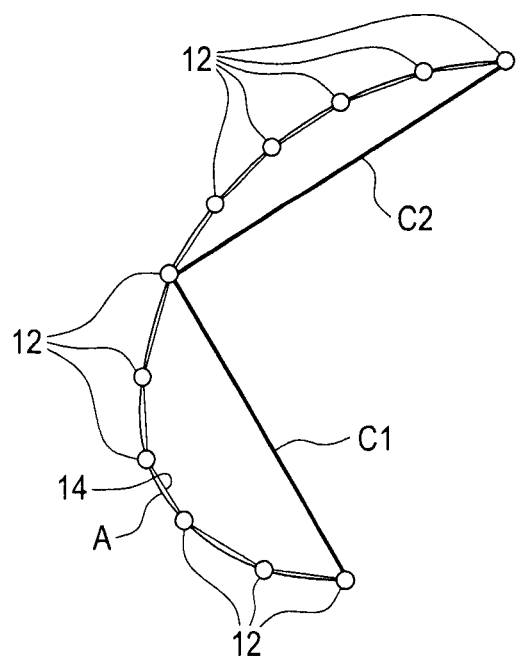
FIG. 2 is a top plan view depicting a calculation of flight path using the using internal GPS readings.

A method and system is provided for tracking the distance traveled by aircraft in flight. Referring to FIG. 2, the method and system described herein can be used to take multiple position data readings 12 along actual flight path A to produce estimated flight path 14, which can be a much closer approximation of the distance traveled by the aircraft along actual flight path A than the distance traveled along the prior art estimated flight path C1 and C2.

Figure 3:
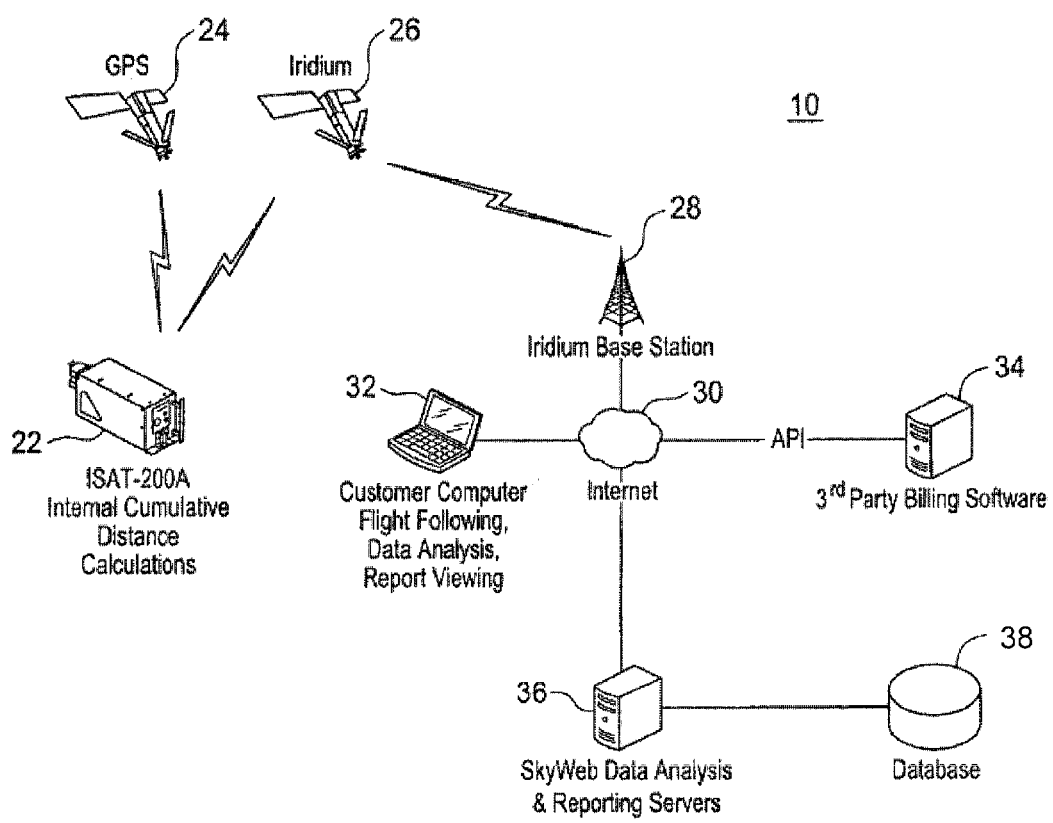
FIG. 3 is a block diagram depicting an embodiment of a system for tracking distance traveled by aircraft.

In some embodiments, distance tracking system 10 can comprise position data transceiver 22 disposed in an aircraft, wherein transceiver can receive wireless position data from a global positioning system ("GPS") satellite, shown as GPS satellite 24 in FIG. 3. Upon taking a plurality of location position data readings along actual flight path A, transceiver 22 can assemble the plurality of data readings into a packet, and then buffer the packet for wireless transmission over a satellite telephone link to satellite 26, which can then relay the packet to base station 28, whereupon the packet received at base station 28 can be re-transmitted over internet 30 to a customer's computer, shown as computer 32 in FIG. 3, computer 32 comprising software that can be configured for analyzing the data readings in the packet and to prepare reports regarding the distance traveled by the aircraft. In some embodiments, a position data reading can be taken by transceiver 22 once every second. In some embodiments, the packet of data readings can be transmitted at a predetermined frequency, which can range from transmitting the packet once every minute to once every 15 minutes.

The received packet can also be transmitted over internet 30 to billing system 34 for analyzing the distance traveled by the aircraft and to prepare and issue invoices regarding the use of the aircraft and the distance traveled by the aircraft. In some embodiments, system 10 can also comprise data analysis server 36, which can be comprise computer software configured to analyze the data readings in the packet for reporting purposes, and for storing the data readings and/or generated reports in database 38 operatively connected to server 36.

Figure 4:
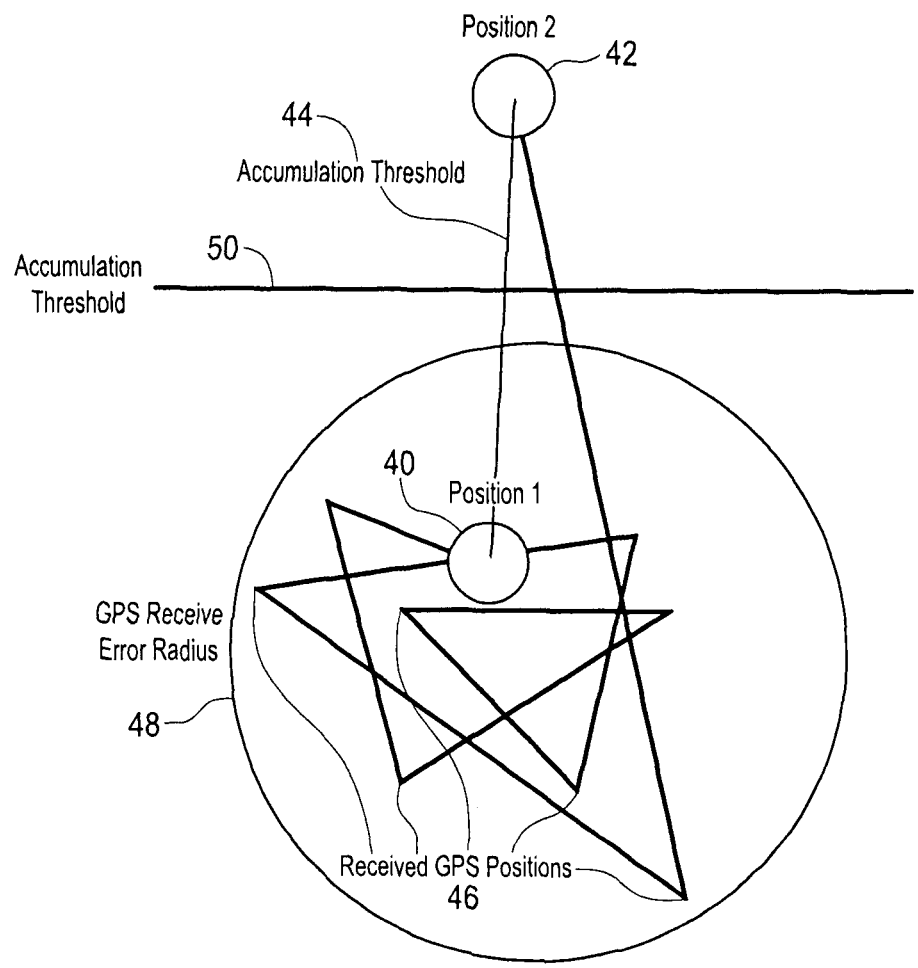
FIG. 4 is a block diagram depicting an error rejection algorithm.

In some embodiments, system 10 can comprise an error algorithm to prevent the accumulation of noise in the position data readings taken. Referring to FIG. 4, an aircraft (such as a helicopter) can fly in random patterns about a given position whereupon a number of data position readings 46 can be taken in close proximity to a given position 40. In order to reduce the number of erroneous readings taken about position 40 to determine the distance 44 between position 40 and position 42, system 10 can comprise means for setting receive error radius 48, wherein transceiver 22 can discard multiple position data readings taken proximate to position 40 that do not exceed receive error radius 48. In some embodiments, system 10 can further comprise means for setting a distance accumulation threshold, shown as threshold 50 in FIG. 4, that can be used by transceiver 22 to accumulate position data readings and to calculate distance traveled only after the aircraft has traveled sufficient distance to meet the threshold. In the illustrated example, to start accumulating position data on the flight path from position 40 to position 42 after threshold 50 has been crossed.

Figure 5:
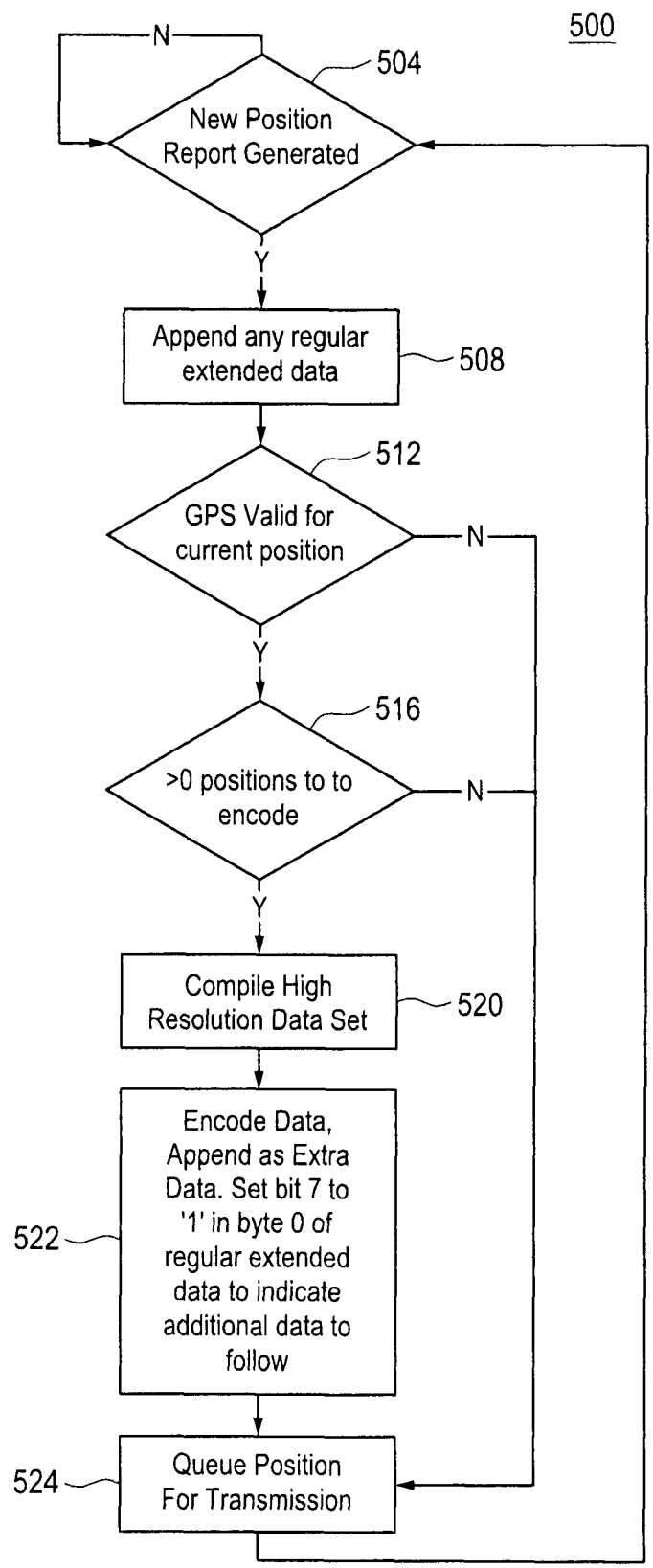
FIG. 5 is a flowchart depicting a position reporting algorithm.

Referring to FIG. 5, an embodiment of a position reporting algorithm that can be carried out by system 10 is shown as process 500. In some embodiments, process 500 can start at step 504, wherein a decision can be made on whether a new position report is to be generated. If "no", then process 500 loops at step 504 until a new position report is to be generated, wherein regular data is appended at step 508. At step 512, a decision can be made to determine if the GPS data for a current position is valid. If "no", process 500 proceeds to step 524 described below. If "yes", another decision can be made at step 516 to determine whether there are more than 0 positions to encode. If "no", process 500 proceeds to step 524. If "yes", a high resolution data set can be compiled at step 520. At step 522, data can be encoded and be appended as Extra Data, wherein bit 7 can be set to "1" in byte 0 of regular extended data to indicate that additional data is to follow. At step 524, the position data can be queued for transition following which, process 500 can return to step 504 to repeat.

Figure 6:
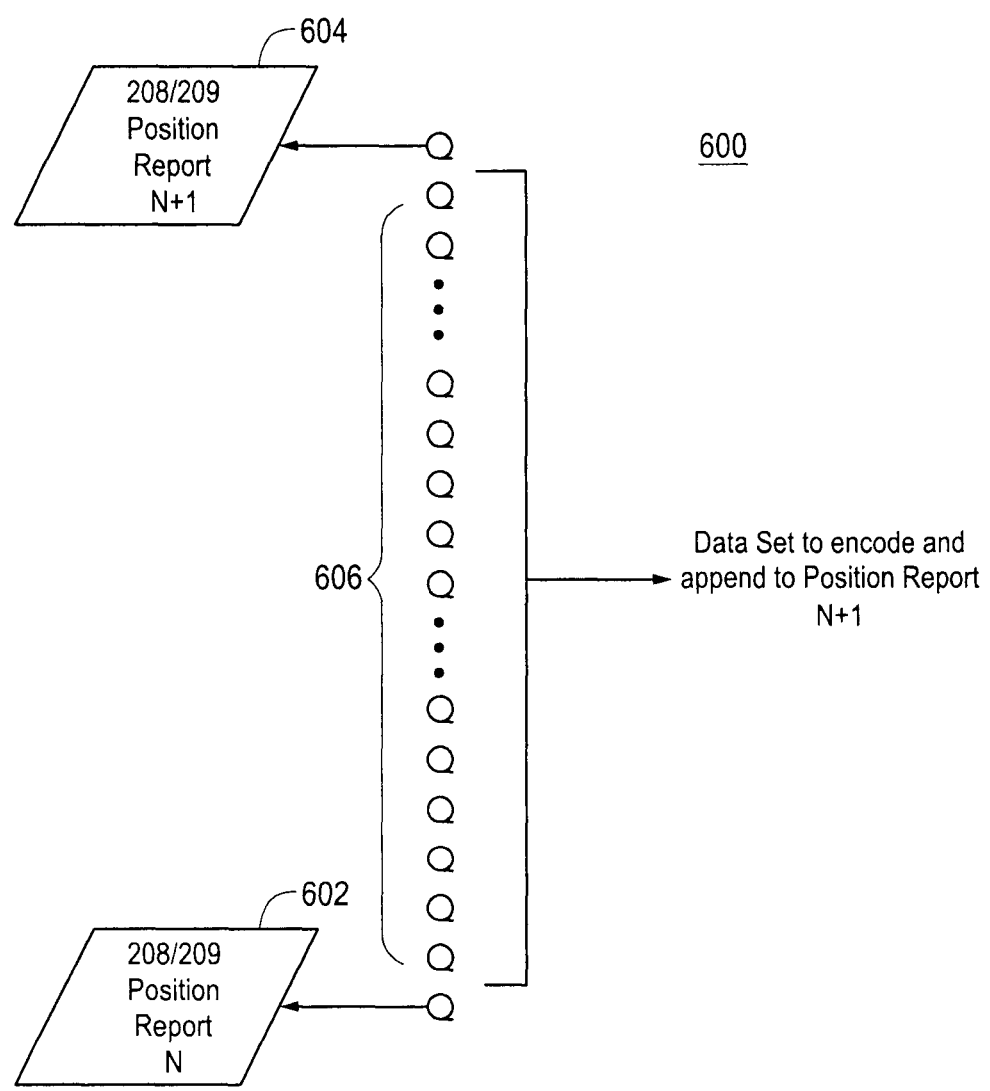
FIG. 6 is a block diagram depicting data buffering.

Referring to FIG. 6, an embodiment of process 600 for buffering position data readings for transmission is shown that can be carried out by system 10. Position data readings, as represented as 606, can be encoded and appended to position report 602, representing position "N", to produce position report 604, representing position N+1.

Figure 7A:
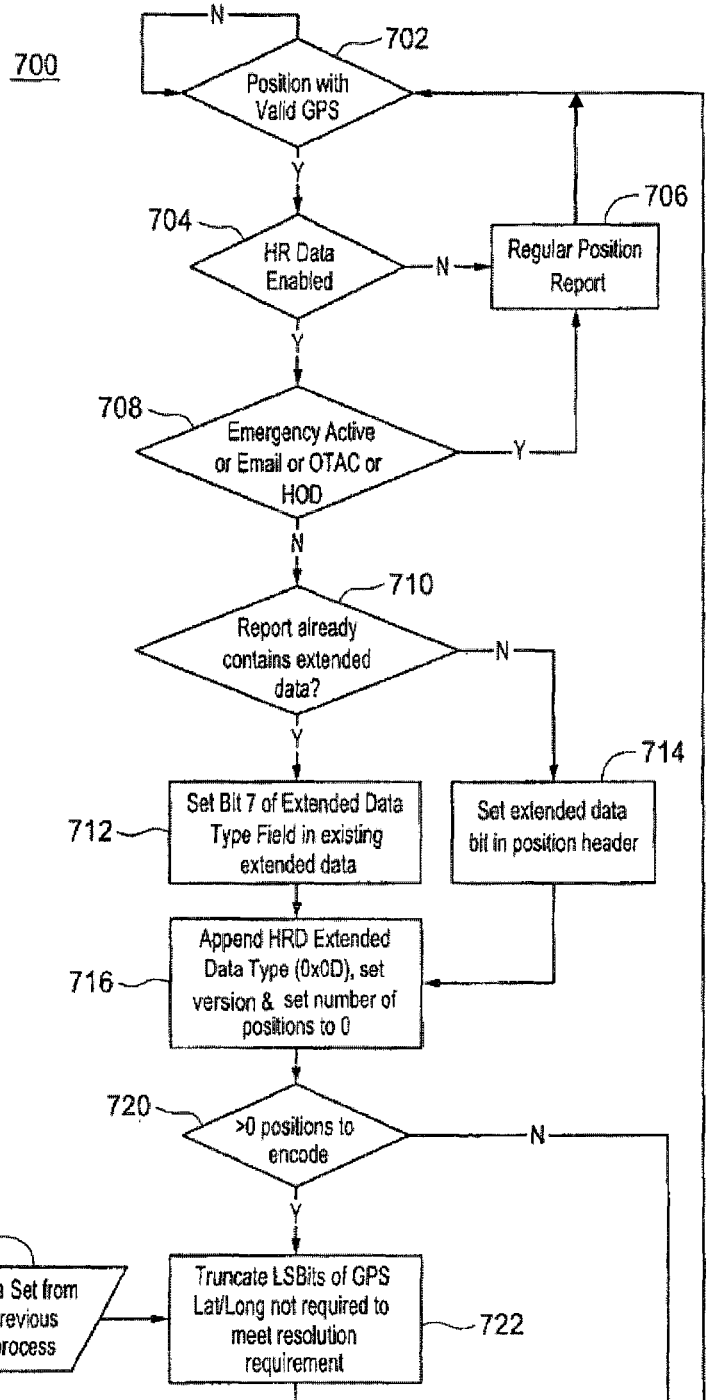
FIG. 7 is a flowchart depicting an encoding algorithm.

Referring to FIG. 7, an embodiment of an encoding algorithm that can be carried out by system 10 for encoding position data readings for transmission is shown as process 700. In some embodiments, process 700 can start at step 702, wherein a decision can be made as to whether a position has a valid GPS reading. If "no", process 700 loops at step 702 until the position has a valid GPS reading, upon which process 700 proceeds to step 704, where a decision can be made on whether high resolution data is to be enabled. If "no", then process 700 proceeds to step 706, where a regular position report can be prepared following which, process 700 can return to step 702. If "yes", process 700 can proceed to step 708, where a decision can be made on whether there is an Active Emergency, an email being transmitted, an over the air command ("OTAC"—a message used to set configuration parameters or alter transceiver behavior during operations that is transmitted or received over the satellite link) being transmitted or a history on demand ("HOD") report (a type of position report that contains additional flight data within the extended data field) being requested. If "yes" to any of these conditions, then process 700 can proceed to step 706, as described above. If "no", then a decision can be made at step 710 on whether the position report already contains extended data. If "no", the extended data bit can be set in the position header at step 714. If "yes", bit 7 of the Extended Data Type Field can be set to "1" in existing extended data at step 712. Both steps 712 and 714 can then proceed to step 716, wherein High Resolution Data Extended Data Type (OxOD) can be appended, and wherein version and set numbers of position can be set to "0". At step 720, a decision can be made to determine whether there are more than 0 positions to encode. If "no", then process 700 can proceed to step 750, wherein the position can be queued for transmission following which, process 700 can return to step 702. If "yes", process 700 can proceed to step 722, wherein the least significant bits of the GPS latitude and longitude can be truncated as they are not required to meet a resolution requirement. In some embodiments, step 722 can have dataset 724 from a previous operation of process 700 as an input. At step 726, the deltas between subsequent positions (Delta 1) can be calculated. At step 728, signed deltas between subsequent deltas (Delta2) can be calculated and encoded in accordance with the table as shown in step 728. At step 730, the first position can be encoded as Delta1 and added to extra data. At step 732, a decision can be made as to whether there are more than zero positions left to encode. If "no", then process 700 can proceed to step 750, as described above. If "yes", then process 700 can proceed to step 734, wherein a decision can be made as to whether the Latitude Delta2 exceeds the range as defined in step 728. If "no", then the Latitude of the position reading can be encoded as Delta2 only. If "yes", then the process 700 can proceed to step 738 where the Latitude of the position reading can be encoded as Delta2 followed by Delta1. Both steps 734 and 736 can then proceed to step 740, wherein a decision can be made as to whether the Longitude Delta2 exceeds the range as defined in step 728. If "no", then the Longitude of the position reading can be encoded as Delta2 only. If "yes", then the Longitude of the position reading can be encoded as Delta2 followed by Delta1. Both steps 742 and 744 can then proceed to step 746, wherein a decision can be made as to whether, in a first phase, the packet size exceeds 128 bytes with new data and to whether, in a second phase, the high resolution data extended data size exceeds 62 bytes with new data. If "no" in either phase, process 700 can then proceed to step 748 to append new encoded position to extra data, and increment the number of positions, whereupon process 700 can proceed to step 732, as described above. If "yes" in either phase, process 700 can proceed to step 750, as described above.

FIG. 8 illustrates one embodiment of the encoding calculations that can be carried out by process 700. The encoding process can be used to compress the data to minimize the size of the data packets for wireless transmission. In this example, the row labelled "First Difference" represents Delta1, as described above and illustrated in FIG. 7, and the row labelled "Second Difference" represents Delta2, as described and illustrated in FIG. 7.

Referring to FIG. 9, a sample set of data positions, set forth in the table as the uppermost row labelled "Full Resolution Position", is represented by a numeric figure. For the positions P(N−1) to P(N−5), the Delta1s and Delta2s are set out in the subsequent rows in accordance with the calculations shown in FIG. 8. FIG. 9 further illustrates an example of encoding position data readings.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for tracking distance travelled by an aircraft in flight, the method comprising the steps of:
   a) collecting position data of the aircraft at least two different times during the flight, representing at least two different positions of the aircraft;
   b) building a packet of the collected position data;
   c) encoding the packet for wireless transmission using an encoding algorithm comprising the steps of:
      i) determining a parameter based at least on a difference between the two different positions of the collected position data collected at different times during the flight;
      ii) determining a bit string based on a predetermined relationship uniquely associating each of a plurality of different bit string values to one of a plurality of different parameter values; and
      iii) encoding one of the two positions based on the determined bit string;
   d) transmitting the encoded packet to a ground station.

2. The method as set forth in claim 1, further comprising the step of collecting a plurality of the position data for each of a plurality of consecutive predetermined periods of time during the flight.

3. The method as set forth in claim 2, wherein each predetermined period of time comprises one minute.

4. The method as set forth in any one of claims 1 to 3, wherein the step of collecting position data further comprises the step of collecting global positioning system ("GPS") position data of the aircraft.

5. The method as set forth in claim 4, further comprising the step of collecting one GPS position per second.

6. The method as set forth in claim 4, further comprising the step of using a position reporting algorithm for collecting the position data.

7. The method as set forth in claim 1, further comprising the step of buffering the packet prior to encoding the packet.

8. The method of claim 1, wherein the step of determining the parameter based at least on a difference between two positions of the collected position data collected at different times during the flight, comprises:
   a) determining a first difference between a second position of the collected position data and a first position of the collected position data, wherein the second position is collected subsequent to the first position during the flight;
   b) determining a second difference between a third position of the collected position data and the second position, wherein the third position is collected subsequent to the second position during the flight; and
   c) determining a third difference between the second difference and the first difference.

9. The method of claim 8, wherein the step of encoding one of the two positions based on the determined bit string comprises encoding the third position as the determined bit string.

10. The method of claim 1, wherein the bit string has a bit length of 3 bits.

11. The method of claim 1, wherein the encoding algorithm further comprises truncating least significant bits of the collected position data before the step of determining the parameter based on at least on a difference between two positions of the collected position data collected at different times during the flight.

12. The method of claim 1, wherein the method further comprises removing noise from the position data using an error algorithm comprising the steps of:
   a) determining if a position of the position data is within an error radius for a given position; and
   b) if the position is not within the error radius, then discarding the position from the collected position data.

* * * * *